(12) United States Patent
Kim et al.

(10) Patent No.: US 9,443,296 B2
(45) Date of Patent: Sep. 13, 2016

(54) APPARATUS FOR MATCHING BLOCKS OF STEREO IMAGE

(71) Applicant: UNIVERSITY-INDUSTRY COOPERATION GROUP OF KYUNG-HEE UNIVERSITY, Yongin-si, Gyeonggi-do (KR)

(72) Inventors: JinSang Kim, Yongin-si (KR); JooHan Kim, Seoul (KR); MinSu Choi, Suwon-si (KR); IkJoon Chang, Seoul (KR)

(73) Assignee: UNIVERSITY-INDUSTRY COOPERATION GROUP OF KYUNG-HEE UNIVERSITY, Yongin-Si, Gyeonggi-Do (KR)

( * ) Notice: Subject to any disclaimer, the term of this patent is extended or adjusted under 35 U.S.C. 154(b) by 218 days.

(21) Appl. No.: 14/071,950

(22) Filed: Nov. 5, 2013

(65) Prior Publication Data
US 2014/0347351 A1    Nov. 27, 2014

(30) Foreign Application Priority Data

May 23, 2013    (KR) .................. 10-2013-0058364

(51) Int. Cl.
G09G 5/37    (2006.01)
G06T 7/00    (2006.01)
H04N 19/176    (2014.01)
H04N 7/015    (2006.01)

(52) U.S. Cl.
CPC .............. *G06T 7/0002* (2013.01); *G06T 7/003* (2013.01); *H04N 19/176* (2014.11); *G06T 2207/10021* (2013.01); *G06T 2207/20021* (2013.01); *H04N 7/0157* (2013.01)

(58) Field of Classification Search
None
See application file for complete search history.

(56) References Cited

U.S. PATENT DOCUMENTS

| | | | |
|---|---|---|---|
| 5,812,199 A * | 9/1998 | Lu et al. .................. | 375/240.16 |
| 6,137,837 A * | 10/2000 | Nemiroff et al. ........ | 375/240.16 |
| 6,169,766 B1 * | 1/2001 | Aoki et al. ............... | 375/240.16 |
| 6,249,550 B1 * | 6/2001 | Mizuno et al. .......... | 375/240.24 |

* cited by examiner

*Primary Examiner* — Jacinta M Crawford
*Assistant Examiner* — Diane Wills
(74) *Attorney, Agent, or Firm* — Hauptman Ham, LLP

(57) ABSTRACT

The present invention relates to a block matching apparatus, and more particularly, to a block matching apparatus, in which a normal driving power and a low driving power are alternately applied to an absolute difference calculation unit for calculating an absolute difference between a pixel of a first image frame and a pixel of a second image frame corresponding thereto among two stereo image frames, and a low absolute difference of corresponding pixels calculated using the low driving power is compensated with a high absolute difference of adjacent corresponding pixels calculated using the normal driving power, so that since a separate estimation unit does not need to be provided, the block matching apparatus can be lightly manufactured in terms of hardware and can reduce power consumption.

12 Claims, 6 Drawing Sheets

-- Prior Art --

FIG 2

-- Prior Art --

APPARATUS FOR MATCHING BLOCKS OF STEREO IMAGE

CROSS-REFERENCE TO RELATED APPLICATIONS

This application claims the benefit of Korean Patent Application No. 10-2013-0058364, filed on May 23, 2013 in the Korean Intellectual Property Office, which is incorporated herein by reference in its entirety.

BACKGROUND OF THE INVENTION

1. Field of the Invention

Exemplary embodiments of the present invention relate to a block matching apparatus, and more particularly, to a block matching apparatus, in which a normal driving power and a low driving power are alternately applied to an absolute difference calculation unit for calculating an absolute difference between a pixel of a first image frame and a pixel of a second image frame corresponding thereto among two stereo image frames, and a low absolute difference of corresponding pixels calculated using the low driving power is compensated with a high absolute difference of adjacent corresponding pixels calculated using the normal driving power, so that since a separate estimation unit does not need to be provided, the block matching apparatus can be lightly manufactured in terms of hardware and can reduce power consumption.

2. Description of Related Art

Since a stereo image is an image of an object photographed from different positions at the same moment, a lot of redundant information appears between two image frames, i.e., a left-side image frame and a right-side image frame. Accordingly, compression efficiency can be enhanced by removing such redundancy.

Motion estimation and compensation is used to reduce temporal redundancy between consecutive image frames in an existing two-dimensional image. In the case of a stereo image frame, spatial redundancy similar to the temporal redundancy in the existing two-dimensional image frame also exists between the left-side image frame and the right-side image frame. Such spatial redundancy can be removed using disparity estimation and compensation. The disparity estimation and compensation is performed through a process of setting either the left-side image frame or the right-side image frame as a reference image frame, independently encoding the reference image frame, and then estimating the other image frame in the unit of a block based on the encoded reference image frame.

Blocking matching refers to searching for a unit block matching to the unit block of the reference image frame from the other image frame, and a block having a minimum difference between the unit block of the reference image block and the unit block of the other image frame is searched from the other image frame. Here, the unit block having a minimum difference between the unit block of the reference image block and the unit block of the other image frame is calculated using a sum of absolute difference (SAD).

Figure 1:
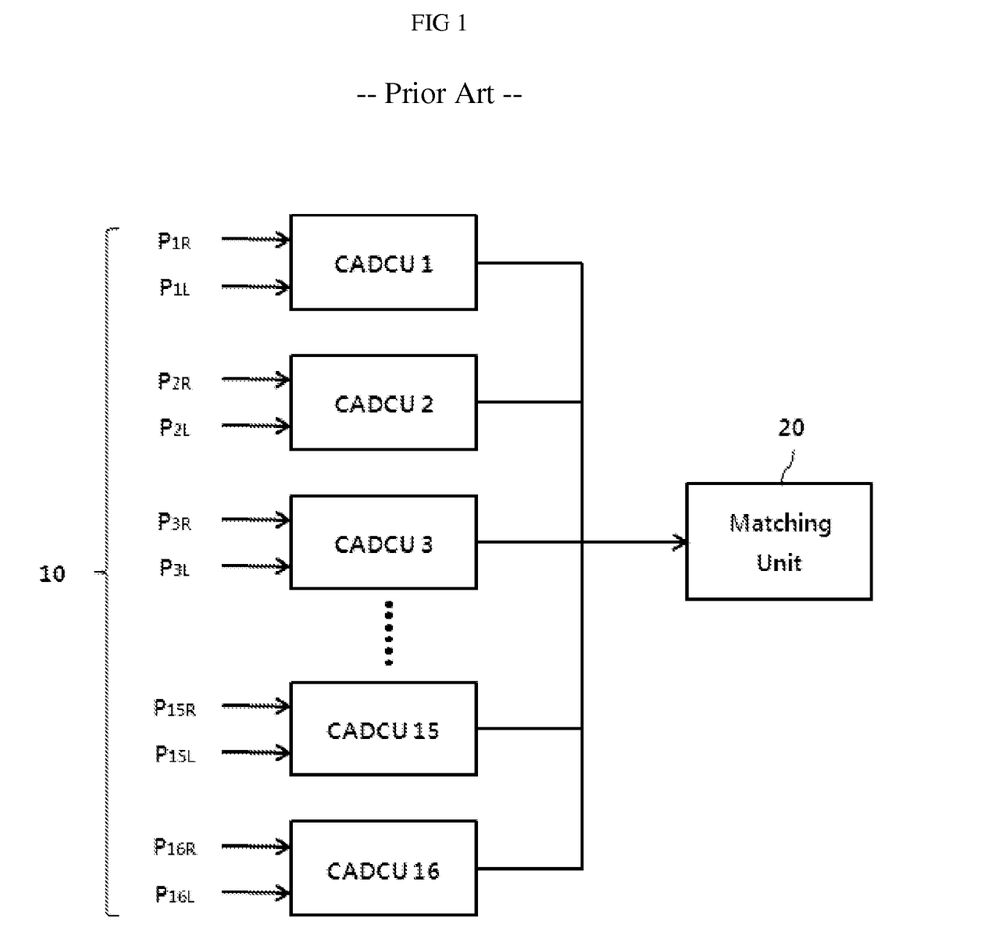
FIG. 1 is a functional block diagram showing a conventional block matching apparatus in accordance with the prior art.

FIG. 1 is a functional block diagram showing a conventional block matching apparatus in accordance with the prior art.

The conventional block matching apparatus in accordance with the prior art will be described hereinafter in more detail with reference to FIG. 1.

When a matching block is searched from two image frames using a 4×4 unit block, a bit value is input into the compensation absolute difference calculation unit 10 for each of sixteen pixels constituting the 4×4 unit block of a first image frame, i.e., a reference image frame, and each of sixteen pixels constituting the 4×4 unit block of a second image frame, i.e., the other image frame. For example, a first pixel of the first image frame and a first pixel of the second image frame corresponding thereto are input into the compensation absolute difference calculation unit 1, and a second pixel of the first image frame and a second pixel of the second image frame corresponding thereto are input into the compensation absolute difference calculation unit 2. Like this, all the pixels constituting the 4×4 unit block of the first image frame and all the corresponding pixels constituting the 4×4 unit block of the second image frame are input into the compensation absolute difference calculation units respectively assigned to each pixel.

The compensation absolute difference calculation unit (CADCU) 10 calculates a compensation absolute difference between bit values of a pixel of the first image frame and a pixel of the second image frame corresponding thereto based on the bit values of the pixel of the first image frame and the pixel of the second image frame corresponding thereto. The matching unit 20 calculates a sum of the compensation absolute difference of each pixel unit calculated by each compensation absolute difference calculation unit, and determines a unit block having a minimum sum among the unit blocks of the second image frame as the matching block.

Figure 2:
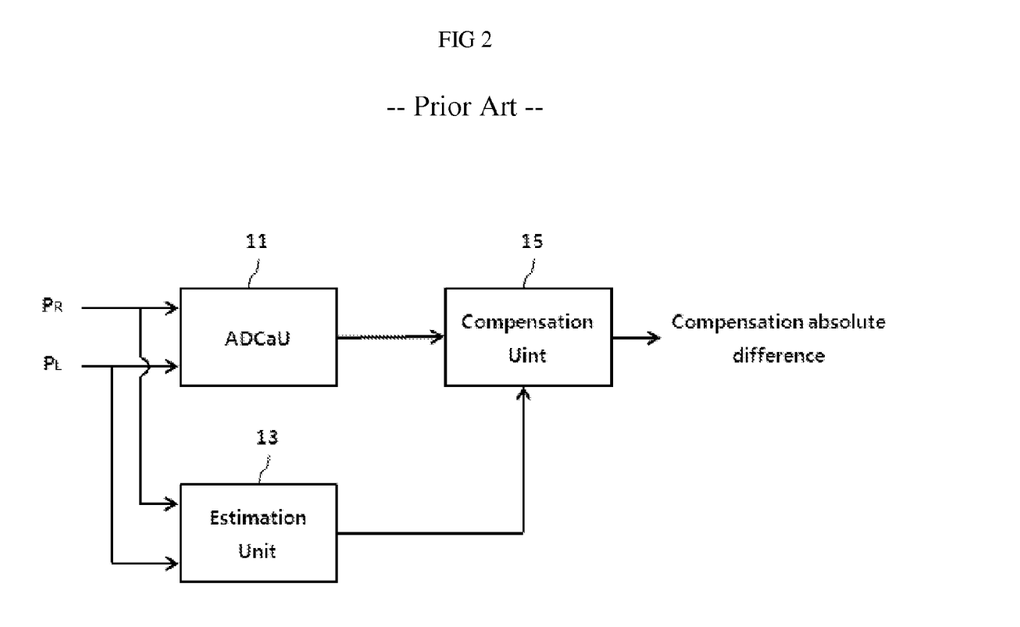
FIG. 2 is a view further specifically showing a compensation absolute difference calculation unit of a conventional block matching apparatus in accordance with the prior art.

FIG. 2 more specifically shows a compensation absolute difference calculation unit of a conventional block matching apparatus in accordance with the prior art.

Referring to FIG. 2, the compensation absolute difference calculation unit 10 includes an absolute difference calculation unit (ADaCU) 11, an estimation unit 13 and a compensation unit 15.

When bit values of a pixel of the first image frame and a pixel of the second image frame corresponding thereto are input into the absolute difference calculation unit 11, the absolute difference calculation unit 11 calculates an absolute difference (AD) between the pixel values of the pixel of the first image frame and the pixel of the second image frame corresponding thereto using the following Equation 1. Generally, the pixel values of the pixel of the first image frame and the pixel of the second image frame are represented in eight bits.

$$AD = |P_{Ri} - P_{Li}| \qquad \text{[Equation 1]}$$

wherein $P_{Ri}$ denotes a pixel value of a pixel of the first image frame $R_i$, and $P_{Li}$ denotes a pixel value of a pixel of the second image frame $L_j$ corresponding to the pixel of the first image frame $R_i$.

The block matching process requires the largest amount of computation and consumes a large amount of power in encoding a stereo image, and a driving power lower than a normal driving power is applied to the absolute difference calculation unit 11 in order to reduce the power consumption in the block matching process. Since a lower driving power is applied to the absolute difference calculation unit 11, an error may occur in the absolute difference between the pixel values of the pixel of the first image frame and the pixel of the second image frame corresponding thereto calculated by the absolute difference calculation unit 11, and the estimation unit 13 applied with a normal driving power estimates and compensates the error in the absolute difference occurring at the absolute difference calculation unit 11. The estimation unit 13 calculates an estimated absolute difference using only some upper bits of the eight bits representing the pixel values of the pixel of the first image frame and the pixel of the second image frame corresponding thereto in order to reduce the power consumption and the amount of computation.

The compensation unit 15 compares the absolute difference calculated by the absolute difference calculation unit 11 with the estimated absolute difference calculated by the estimation unit 13, and determines that the absolute difference calculated by the absolute difference calculation unit 11 does not have an error if the absolute difference calculated by the absolute difference calculation unit 11 is equal to the estimated absolute difference calculated by the estimation unit 13. On the contrary, if the absolute difference calculated by the absolute difference calculation unit 11 is different from the estimated absolute difference calculated by the estimation unit 13, the upper bits of the absolute difference calculated by the absolute difference calculation unit 11 are compensated with bit values of the estimated absolute difference calculated by the estimation unit 13.

The conventional blocking matching apparatus as described above can reduce the power consumed for block matching by applying a lower driving power to the absolute difference calculation unit 11. However, such a conventional blocking matching apparatus entails a problem in that since the estimation unit 13 and the compensation unit 15 for estimating and compensating an error occurred in the absolute difference calculated by the absolute difference calculation unit 11 should be provided in each compensation absolute difference calculation unit, the number of hardwares of the blocking matching apparatus increases and each compensation absolute difference calculation unit consumes a large amount of power to estimate the error in the absolute difference.

SUMMARY OF THE INVENTION

Accordingly, the present invention has been made to solve the above-mentioned problems involved in the conventional block matching apparatus, and it is an object of the present invention to provide a block matching apparatus that can perform block matching with small power consumption.

Another object of the present invention is to provide a block matching apparatus in which a normal driving power and a low driving power are alternately applied to an absolute difference calculation unit for calculating an absolute difference between a pixel of a first image frame and a pixel of a second image frame corresponding thereto and compensating an absolute difference calculated using the low driving power with an absolute difference of adjacent pixels calculated using the normal driving power, thereby eliminating the necessity for a separate estimation unit.

To accomplish the above objects, in one aspect, the present invention provides a block matching apparatus for estimating a disparity between two image frames, including:

an absolute difference calculation unit for receiving bit values representing pixel values of corresponding pixels corresponding to each other in an N×N unit block of a first image frame and an N×N unit matching block of a second image frame matching to the N×N unit block of the first image frame among the two image frames, and calculating an absolute difference between the corresponding pixels; a power control unit for alternately applying a normal driving power and a low driving power to a plurality of absolute difference calculation units for calculating the absolute difference between the corresponding pixels; a compensation unit for compensating a low absolute difference of the corresponding pixels calculated by an absolute difference calculation unit applied with the low driving power with a normal absolute difference of adjacent corresponding pixels adjacent to the corresponding pixels calculated by an absolute difference calculation unit applied with the normal driving power; and a matching unit for determining an N×N unit matching block having a minimum sum by adding the low absolute difference compensated by the compensation unit and the normal absolute difference.

Here, the N×N unit matching block of the second image frame matching to the N×N unit block of the first image frame may exist within a search window.

In accordance with an exemplary embodiment of the present invention, the compensation unit may include: a comparison unit for comparing a bit value of the low absolute difference with a bit value of the normal absolute difference; and an absolute difference compensation unit for compensating the low absolute difference with an average value of the normal absolute differences of the adjacent corresponding pixels if the bit value of the low absolute difference is different from the bit value of the normal absolute difference.

In accordance with another exemplary embodiment of the present invention, the compensation unit may include: an upper bit extraction unit for extracting predetermined upper bit values from bit values of the low absolute difference and the normal absolute difference; a comparison unit for comparing the upper bit values of the low absolute difference with the upper bit values of the normal absolute difference; and an absolute difference compensation unit for compensating the low absolute difference with an average value of the normal absolute differences of the adjacent corresponding pixels if the upper bit values of the low absolute difference are different from the upper bit values of the normal absolute difference.

If the bit value or the upper bit values of the low absolute difference are identical to the bit value or the upper bit values of the normal absolute difference of any adjacent corresponding pixels, the absolute difference compensation unit maintains the bit value of the low absolute difference.

Preferably, when the upper bit values of the low absolute difference are different from the upper bit values of the normal absolute difference, the absolute difference compensation unit compensates the upper bit values of the low absolute difference with the upper bit values of the average value of the normal absolute differences of the adjacent corresponding pixels.

In another aspect, the present invention provides an apparatus for estimating a disparity between two image frames includes: a block matching unit for alternately applying a low driving power and a normal driving power to an absolute difference calculation unit for calculating an absolute difference between an N×N unit block of a first image frame and an N×N unit matching block of a second image frame matching to the N×N unit block of the first image frame among the two image frames, and determining an N×N unit matching block matching to the N×N unit block by compensating a low absolute difference calculated by an absolute difference calculation unit applied with the low driving power with a normal absolute difference of adjacent corresponding pixels calculated by an absolute difference calculation unit applied with the normal driving power; and a disparity estimation unit for estimating a disparity between the two image frames based on a disparity between the determined N×N unit matching block and the N×N unit block.

Here, the block matching unit may include: an absolute difference calculation unit for receiving bit values representing pixel values of corresponding pixels corresponding to each other in an N×N unit block of a first image frame and an N×N unit matching block of a second image frame corresponding to the N×N unit block of the first image frame among the two image frames, and calculating an absolute difference between the corresponding pixels; a power control unit for alternately applying a normal driving power and a low driving power to a plurality of absolute difference calculation units for calculating an absolute difference between the corresponding pixels; a compensation unit for compensating a low absolute difference of the corresponding pixels calculated by an absolute difference calculation unit applied with the low driving power with a normal absolute difference of adjacent corresponding pixels adjacent to the corresponding pixels calculated by an absolute difference calculation unit applied with the normal driving power; and a matching unit for determining an N×N unit matching block having a minimum sum by adding the low absolute difference compensated by the compensation unit and the normal absolute difference.

BRIEF DESCRIPTION OF THE DRAWINGS

The above and other objects, features and advantages of the present invention will be apparent from the following detailed description of the preferred exemplary embodiments of the invention in conjunction with the accompanying drawings, in which.

DESCRIPTION OF THE PREFERRED EMBODIMENTS

A block matching apparatus in accordance with the present invention will be described below in more detail with reference to the accompanying drawings.

Figure 3:
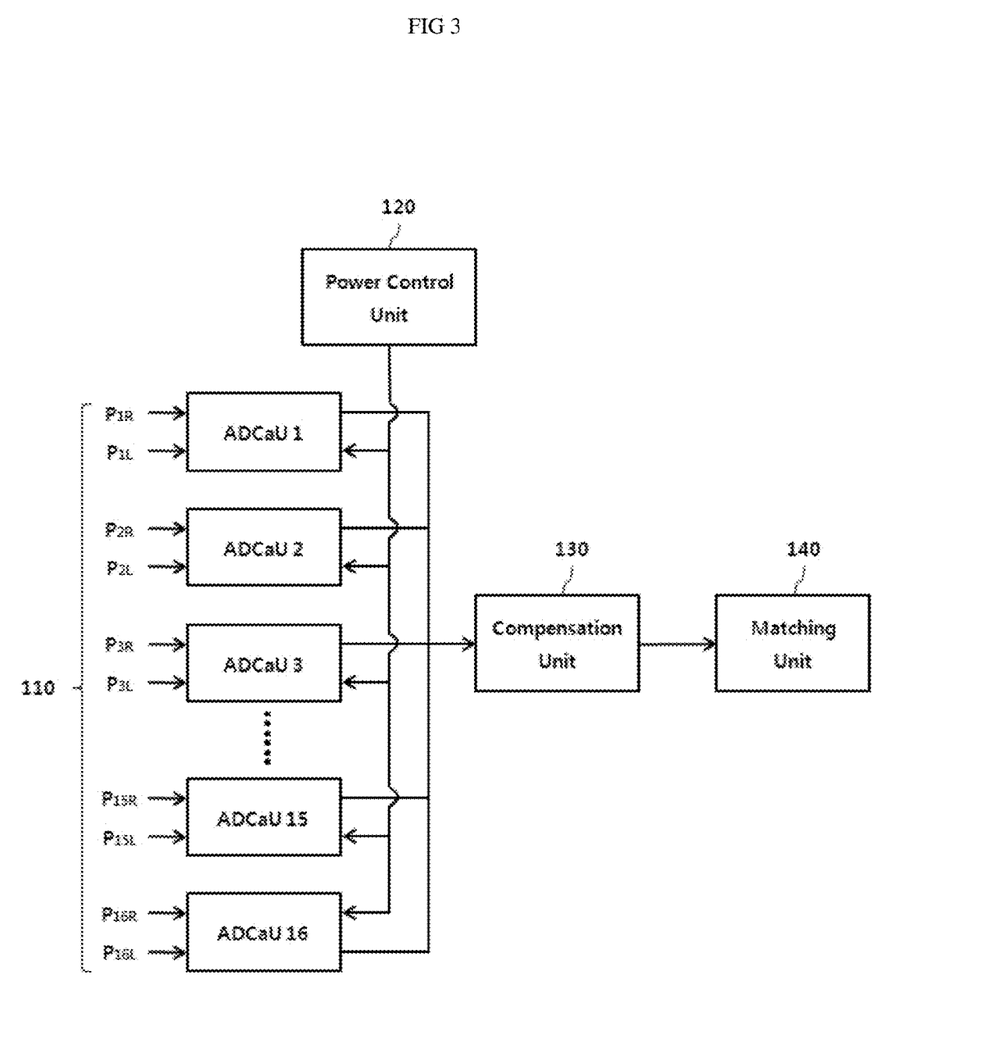
FIG. 3 is a functional block diagram showing a block matching apparatus in accordance with the present invention.

FIG. 3 is a functional block diagram showing a block matching apparatus in accordance with the present invention.

The block matching apparatus will be described hereinafter in more detail with reference to FIG. 3.

Bit values of pixels corresponding to each other in a unit block of a first image frame, which is a reference image frame and a unit matching block of a second image frame, which is the other image frame among two image frames are input into the absolute difference calculation unit (ADCaU) 110. Although it has been described in the following detained description that the size of a unit block is limited to 4×4, a unit block of a different size may be used according to the field to which the present invention is applied, and this falls within the scope of the present invention.

In the case of a unit block having a size of 4×4, for example, pixel values of a first pixel of the first image frame and a first pixel of the second image frame corresponding to the first pixel of the first image frame are input into the absolute difference calculation unit 1, and pixel values of a second pixel of the first image frame and a second pixel of the second image frame corresponding thereto are input into the absolute difference calculation unit 2. Here, the first pixel of the first image frame and the first pixel of the second image frame are referred to as corresponding pixels. Like this, pixel values of the pixels constituting the 4×4 unit block of the first image frame and pixel values of the pixels constituting the 4×4 unit block of the second image frame, i.e., pixel values of the corresponding pixels, are input into the assigned absolute difference calculation units 110.

Figure 5:
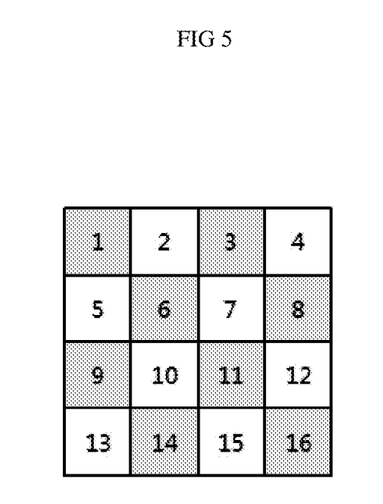
FIG. 5 is a view showing an example of corresponding pixels calculating a low absolute difference with a low driving power and adjacent corresponding pixels calculating a high absolute difference with a normal driving power.

The power control unit 120 controls the driving power applied to the absolute difference calculation units 110 respectively assigned to each corresponding pixel, and, describing in more detail, the power control unit 120 applies a normal driving power to an absolute difference calculation unit for calculating an absolute difference of first corresponding pixels and applies a driving power lower than the normal driving power to an absolute difference calculation unit for calculating an absolute difference of adjacent corresponding pixels adjacent to the first corresponding pixels. That is, as shown in FIG. 5, in the case of a 4×4 unit block, a normal driving power is applied to an absolute difference calculation unit which calculates an absolute difference of first corresponding pixels positioned at (1,1), a low driving power is applied to an absolute difference calculation unit which calculates an absolute difference of second corresponding pixels positioned at (1,2), a normal driving power is applied to an absolute difference calculation unit which calculates an absolute difference of third corresponding pixels positioned at (1,3), and a low driving power is applied to an absolute difference calculation unit which calculates an absolute difference of fourth corresponding pixels positioned at (1,4).

Preferably, the power control unit 120 controls driving power to alternately apply a normal driving power and a low driving power to the absolute difference calculation units for calculating an absolute difference of corresponding pixels and an absolute difference of adjacent corresponding pixels. Here, the absolute difference calculation unit applied with the normal driving power may calculate an absolute difference of the corresponding pixels without an error, whereas the absolute difference calculation unit applied with the low driving power may calculate an absolute difference of the corresponding pixels with an error.

The compensation unit 130 compensates a low absolute difference of the corresponding pixels calculated by the absolute difference calculation unit applied with the low driving power with a normal absolute difference of the adjacent corresponding pixels adjacent to the corresponding pixels calculated by the absolute difference calculation unit applied with the normal driving power. A matching unit 140 determines an N×N unit matching block having a minimum sum of absolute difference between the N×N unit block of the first image frame and the N×N unit matching block of the second image frame by adding the low absolute difference compensated by the compensation unit 130 and the normal absolute difference, and determines the N×N unit matching block having a minimum sum of absolute difference as a final N×N unit matching block matched to the N×N unit block of the first image frame.

The sum of absolute difference between the N×N unit block of the first image frame and the N×N unit matching block is calculated while varying the N×N unit matching block existing within a range of a window size set in the second image frame, and an N×N unit matching block having a minimum sum of the compensated low absolute difference and the normal absolute difference is determined as a final N×N unit matching block.

Preferably, a range of a critical distance d from the coordinates of the N×N unit block of the first image frame is set as a window size, and the N×N unit block matching is varied within the range of the window.

Figure 4:
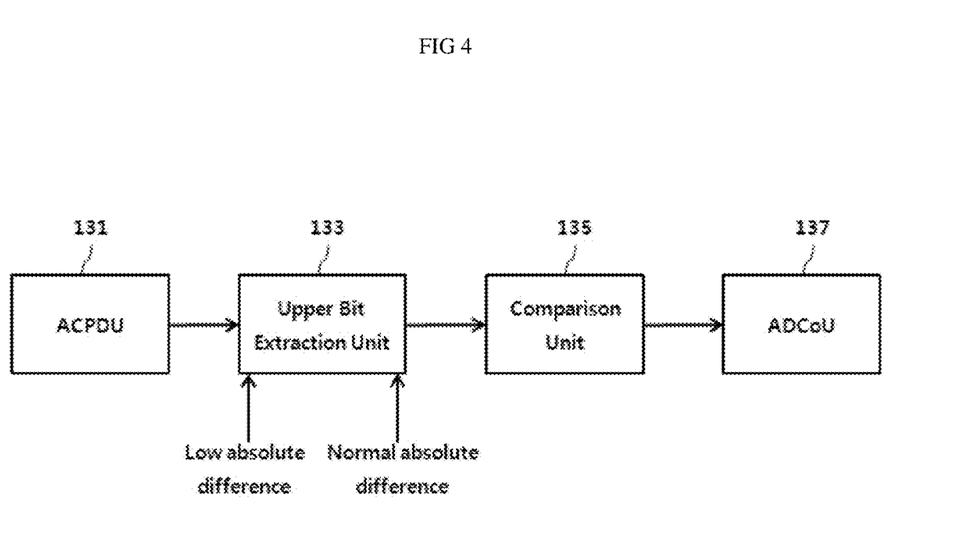
FIG. 4 is a functional block diagram showing a compensation unit in accordance with the present invention.

FIG. 4 is a functional block diagram showing a compensation unit in accordance with the present invention.

The compensation unit will be described hereinafter in more detail with reference to FIG. 4.

An adjacent corresponding pixel determination unit (ACPDU) 131 determines corresponding pixels calculated to have a low absolute difference by applying a low driving power and adjacent corresponding pixels adjacent to the corresponding pixels. Describing with reference to FIG. 6, four corresponding pixels {(1,1), (1,4), (4,1), and (4,4)} positioned at the corners of a 4×4 unit block respectively have two adjacent corresponding pixels, eight corresponding pixels {(1,2), (1,3), (2,1), (2,4), (3,1), (3,4), (4,2), and (4,3)} positioned along the edge of the 4×4 unit block other than the corners respectively have three adjacent corresponding pixels, and four corresponding pixels {(2,2), (2,3), (3,2), and (3,3)} positioned at the center of the 4×4 unit block respectively have four adjacent corresponding pixels.

Referring back to FIG. 4 again, an upper bit extraction unit 133 extracts upper bits from bit values of a low absolute difference of corresponding pixels calculated using a low driving power and a normal absolute difference of adjacent corresponding pixels calculated using a normal driving power. A comparison unit 135 compares upper bit values of the low absolute difference of the corresponding pixels with upper bit values of the normal absolute difference of the adjacent corresponding pixels.

An absolute difference compensation unit (ADCoU) 137 determines whether or not the upper bit values of the low absolute difference of the corresponding pixels are different from the upper bit values of the normal absolute difference of the adjacent corresponding pixels and compensates the low absolute difference of the corresponding pixels with an average value of the normal absolute differences of the adjacent corresponding pixels if the upper bit values of the low absolute difference of the corresponding pixels are different from the upper bit values of the normal absolute difference of the adjacent corresponding pixels.

Preferably, the compensation unit in accordance with the present invention does not have an extraction unit 133, and the comparison unit 135 may compare entire bit values of a low absolute difference of corresponding pixels with entire bit values of a normal absolute difference of adjacent corresponding pixels, and if the entire bit values of the low absolute difference of the corresponding pixels are different from the entire bit values of the normal absolute difference of the adjacent corresponding pixels, the absolute difference compensation unit 137 may compensate the low absolute difference of the corresponding pixels with an average value of the normal absolute differences of the adjacent corresponding pixels.

An example of compensating upper bit values or entire bit values of a low absolute difference of corresponding pixels with upper bit values or entire bit values of a normal absolute difference of adjacent corresponding pixels will be described hereinafter with reference to FIG. 6.

Figure 6:
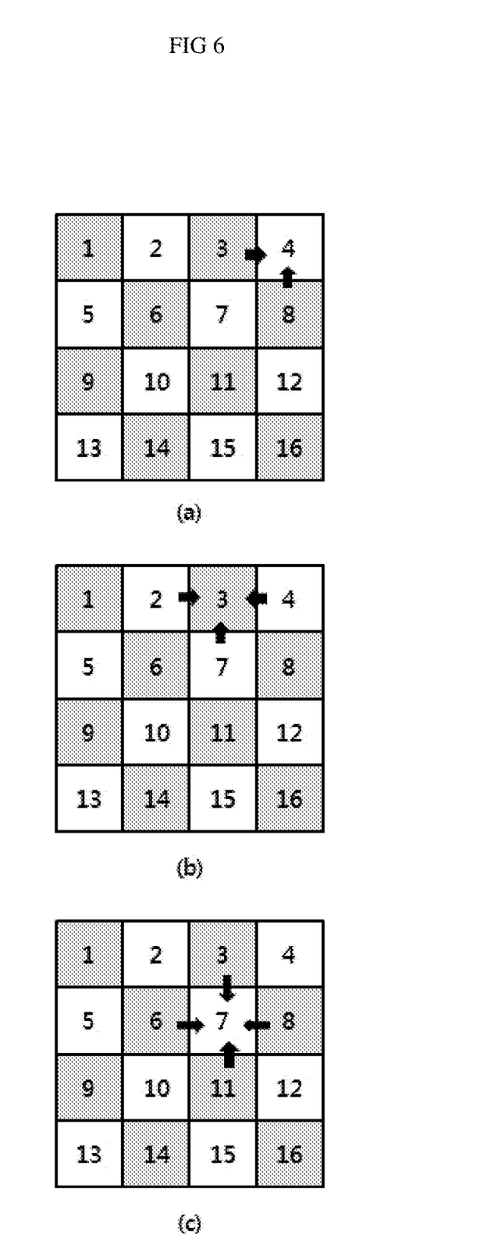
FIG. 6 is a view showing an example of adjacent corresponding pixels adjacent to a corresponding pixel.

In the case of corresponding pixels (1,4) positioned at a corner as shown in FIG. 6(a), the upper bit values or the entire bit values of the low absolute difference of the corresponding pixels (1,4) are compensated with an average value of normal absolute differences of two adjacent corresponding pixels {(1,3), (2,4)}, in the case of corresponding pixels (1,3) positioned on the edge of a 4×4 unit block as shown in FIG. 6(b), the upper bit values or the entire bit values of the low absolute difference of the corresponding pixels (1,3) are compensated with an average value of normal absolute differences of three adjacent corresponding pixels {(1,2), (1,4), and (2,3)}, and in the case of corresponding pixels (2,3) positioned at the center as shown in FIG. 6(c), the upper bit values or the entire bit values of the low absolute difference of the corresponding pixels (2,3) are compensated with an average value of normal absolute differences of four adjacent corresponding pixels {(1,3), (2,2), (3,3), and (2,4)}.

In a first exemplary embodiment of the present invention, when a bit value or upper bit values of a low absolute difference of corresponding pixels are the same as a bit value or upper bit values of a normal absolute difference of any adjacent corresponding pixels, the absolute difference compensation unit 137 does not compensate the bit value of the low absolute difference of the corresponding pixels and maintains the bit value as is. Pixel values of pixels positioned to be adjacent to each other in an image frame do not abruptly change and have a similarity with each other, and if any one of absolute differences among the absolute differences of a plurality of adjacent corresponding pixels is equal to the absolute difference of corresponding pixels, it is determined that an error does not occur in the low absolute difference of the corresponding pixels calculated using a low driving power based on the characteristic of pixel values of an image.

In a second exemplary embodiment of the present invention, when upper bit values of a low absolute difference of corresponding pixels are different from upper bit values of a normal absolute difference of adjacent corresponding pixels, the absolute difference compensation unit 137 compensates the upper bit values of the low absolute difference with the upper bit values of an average value of the normal absolute differences of the adjacent corresponding pixels. In the second exemplary embodiment of the present invention, the amount of computation required for compensating a low absolute difference can be reduced by compensating only upper bits, e.g., four upper bits, instead of compensating the entire bit values of the absolute difference of the corresponding pixels with the entire bit values of the absolute difference of the adjacent corresponding pixels. In addition, since lower bits among the entire bits are actually not important in determining a pixel value, block matching can be performed correctly with a small amount of computation.

The block matching apparatus in accordance with the present invention can be used in block matching for estimating a disparity between two image frames constituting a stereo image or among a plurality of image frames, and block matching for calculating disparity of other image frames from a reference image frame should be preceded among the image frames in order to estimate the disparity. It is possible to match blocks of two image frames and calculate the disparity between the two image frames with a small amount of computation and reduced power consumption based on the matched blocks, using the block matching apparatus in accordance with the present invention.

The disparity estimation apparatus in accordance with the present invention using the block matching apparatus described above includes a block matching unit for alternately applying a low driving power and a normal driving power to an absolute difference calculation unit for calculating an absolute difference between corresponding pixels of an N×N unit block of a first image frame and an N×N unit matching block of a second image frame matching to the N×N unit block of the first image frame among two image frames, and determining an N×N unit matching block matching to the N×N unit block by compensating a low absolute difference calculated by an absolute difference calculation unit applied with the low driving power with a normal absolute difference of adjacent corresponding pixels calculated by an absolute difference calculation unit applied with the normal driving power, and a disparity estimation unit for estimating a disparity between the two image frames based on a disparity between the determined N×N unit matching block and the N×N unit block.

The block matching apparatus in accordance with the present invention has following effects.

The block matching apparatus in accordance with the present invention can be easily manufactured in hardware and perform block matching with reduced power consumption since a separate estimation unit is not needed by alternately applying a normal driving power and a low driving power to an absolute difference calculation unit for calculating an absolute difference between a pixel of a first image frame and a pixel of a second image frame corresponding thereto and compensating a low absolute difference of corresponding pixels calculated using the low driving power with a high absolute difference of adjacent corresponding pixels calculated using the normal driving power.

Meanwhile, the block matching apparatus in accordance with the present invention may compensate a low absolute difference with a small amount of computation within a small error range by compensating the low absolute difference only through comparison of upper bit values among the entire bit values of a low absolute difference and a high absolute difference.

While the present invention has been described in connection with the exemplary embodiments illustrated in the drawings, they are merely illustrative and the invention is not limited to these embodiments. It will be appreciated by a person having an ordinary skill in the art that various equivalent modifications and variations of the embodiments can be made without departing from the spirit and scope of the present invention. Therefore, the true technical scope of the present invention should be defined by the technical spirit of the appended claims.

What is claimed is:

1. A block matching apparatus for estimating a disparity between two image frames, the apparatus comprising:
   an absolute difference calculation unit configured to receive bit values representing pixel values of corresponding pixels corresponding to each other in an N×N unit block of a first image frame and an N×N unit matching block of a second image frame matching to the N×N unit block of the first image frame among the two image frames, and calculating an absolute difference between the corresponding pixels;
   a power control unit configured to alternately apply a normal driving power and a low driving power to the absolute difference calculation unit;
   a compensation unit configured to compensate a low absolute difference of the corresponding pixels calculated by the absolute difference calculation unit applied with the low driving power with a normal absolute difference of adjacent corresponding pixels adjacent to the corresponding pixels calculated by an absolute difference calculation unit applied with the normal driving power; and
   a matching unit configured to determine an N×N unit matching block having a minimum sum by adding the low absolute difference compensated by the compensation unit and the normal absolute difference.

2. The block matching apparatus according to claim 1, wherein the N×N unit matching block of the second image frame matching to the N×N unit block of the first image frame exists within a search window.

3. The block matching apparatus according to claim 2, wherein the compensation unit comprises:
   an upper bit extraction unit configured to extract predetermined upper bit values from bit values of the low absolute difference and the normal absolute difference;
   a comparison unit configured to compare the upper bit values of the low absolute difference with the upper bit values of the normal absolute difference; and
   an absolute difference compensation unit configured to compensate the low absolute difference with an average value of the normal absolute differences of the adjacent corresponding pixels if the upper bit values of the low absolute difference are different from the upper bit values of the normal absolute difference.

4. The block matching apparatus according to claim 1, wherein the compensation unit comprises:
   a comparison unit configured to compare a bit value of the low absolute difference with a bit value of the normal absolute difference; and
   an absolute difference compensation unit configured to compensate the low absolute difference with an average value of the normal absolute differences of the adjacent corresponding pixels if the bit value of the low absolute difference is different from the bit value of the normal absolute difference.

5. The block matching apparatus according to claim 4, wherein if the bit value or the upper bit values of the low absolute difference are identical to the bit value or the upper bit values of the normal absolute difference of any adjacent corresponding pixels, the absolute difference compensation unit is configured to maintain the bit value of the low absolute difference.

6. The block matching apparatus according to claim 4, wherein if the upper bit values of the low absolute difference are different from the upper bit values of the normal absolute difference, the absolute difference compensation unit is configured to compensate the upper bit values of the low absolute difference with the upper bit values of the average value of the normal absolute differences of the adjacent corresponding pixels.

7. An apparatus for estimating a disparity between two image frames, the apparatus comprising:
   an absolute difference calculation unit configured to receive bit values representing pixel values of corresponding pixels corresponding to each other in an N×N unit block of a first image frame and an N×N unit matching block of a second image frame corresponding to the N×N unit block of the first image frame among the two image frames, and calculate an absolute difference between the corresponding pixels;
   a power control unit configured to alternately apply a normal driving power and a low driving power to a plurality of absolute difference calculation units for calculating an absolute difference between the corresponding pixels;

a matching unit configured to
determine an N×N unit matching block matching to the N×N unit block by compensating a low absolute difference calculated by the absolute difference calculation unit applied with the low driving power with a normal absolute difference of adjacent corresponding pixels calculated by the absolute difference calculation unit applied with the normal driving power.

8. The apparatus according to claim 7, further comprising:
a compensation unit configured to compensate the low absolute difference of the corresponding pixels calculated by the absolute difference calculation unit applied with the low driving power with the normal absolute difference of adjacent corresponding pixels adjacent to the corresponding pixels calculated by the absolute difference calculation unit applied with the normal driving power, and
wherein the matching unit is further configured to determine an N×N unit matching block having a minimum sum by adding the low absolute difference compensated by the compensation unit and the normal absolute difference.

9. The apparatus according to claim 8, wherein the compensation unit comprises:
a comparison unit configured to compare a bit value of the low absolute difference with a bit value of the normal absolute difference; and
an absolute difference compensation unit configured to compensate the low absolute difference with an average value of the normal absolute differences of the adjacent corresponding pixels if the bit value of the low absolute difference is different from the bit value of the normal absolute difference.

10. The apparatus according to claim 9, wherein if the bit value or the upper bit values of the low absolute difference are identical to the bit value or the upper bit values of the normal absolute difference of any adjacent corresponding pixels, the absolute difference compensation unit is configured to maintain the bit value of the low absolute difference.

11. The apparatus according to claim 8, wherein the compensation unit comprises:
an upper bit extraction unit configured to extract predetermined upper bit values from bit values of the low absolute difference and the normal absolute difference;
a comparison unit configured to compare the upper bit values of the low absolute difference with the upper bit values of the normal absolute difference; and
an absolute difference compensation unit configured to compensate the low absolute difference with an average value of the normal absolute differences of the adjacent corresponding pixels if the upper bit values of the low absolute difference are different from the upper bit values of the normal absolute difference.

12. The apparatus according to claim 9, wherein if the upper bit values of the low absolute difference are different from the upper bit values of the normal absolute difference, the absolute difference compensation unit is configured to compensate the upper bit values of the low absolute difference with the upper bit values of the average value of the normal absolute differences of the adjacent corresponding pixels.

* * * * *